Jan. 21, 1930.  J. R. BAKER ET AL  1,744,097
MASON'S MOLDING TROWEL
Filed Sept. 20, 1928
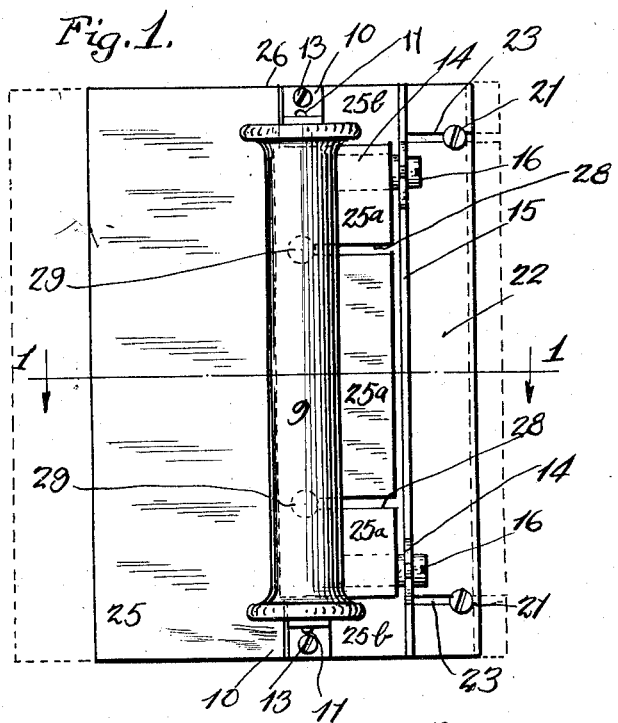
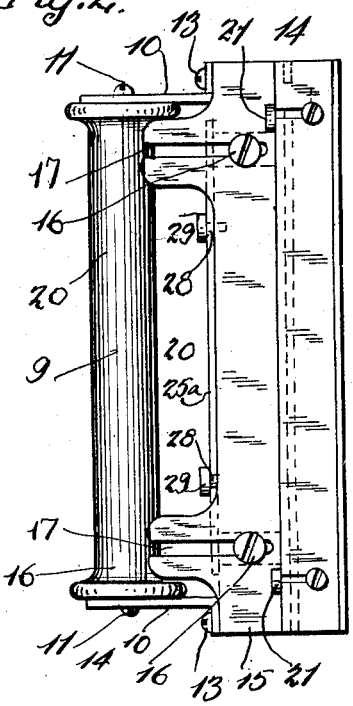
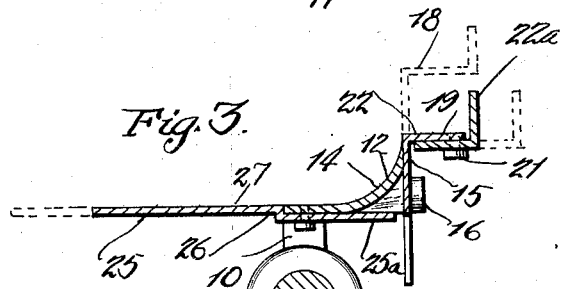
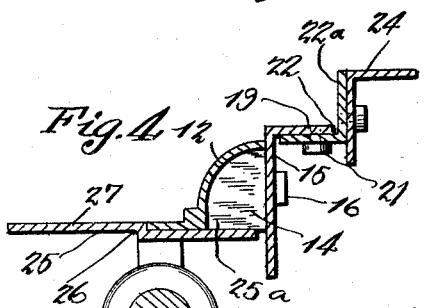
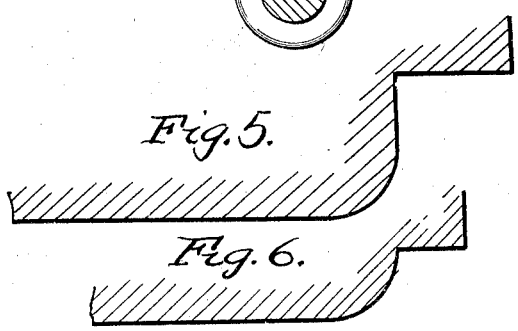
INVENTORS
John R. Baker and
BY Ralph B. Parsons
Francis H. Davis
ATTORNEY.

Patented Jan. 21, 1930

1,744,097

UNITED STATES PATENT OFFICE

JOHN R. BAKER AND RALPH B. PARSONS, OF PACIFIC GROVE, CALIFORNIA

MASON'S MOLDING TROWEL

Application filed September 20, 1928. Serial No. 307,306.

Our trowel relates to finishing tools for forming shapes of various characters on plastic cementitious matter round window and door openings or whenever needed, and has for its primary object to produce a cheap and useful article of manufacture of great service to the users thereof by expediting this hitherto slow and tedious operation.

A further object is to provide a trowel that will simplify the forming of such finishes, and enable a less skilled workman to produce a superior class of work in much less time than is possible by present methods.

Another object is to provide a trowel wherein molding elements, such as rounds, hollows and other characteristic shapes may be used inter-changeably.

Another very important object is to provide articulated, shape-producing members which may be suitably adjusted to meet varying conditions in relation to the work, such as occur when door-jambs or other members to be worked to are set at different distances away from the mold to be produced.

Still another object is to provide means whereby when working in close quarters certain members of the trowel may be removed.

Another object is to provide a tool of this character by which mortar may be applied in a uniform and even manner.

Another object is to provide a trowel of this kind that is simple in construction, readily understandable, easy to adjust, easy to manipulate, thoroughly efficient and inexpensive to manufacture, together with further advantages that will appear, be illustrated in the accompanying drawings and particularly set forth in the appended claims.

In the drawings:—

Figure 1 is a top view of the complete tool according to our invention.

Fig. 2 is an elevational view.

Fig. 3 is a cross-section taken on the line I—I of Fig. 1, with a mold element adapted to form a ¼ round or bull-nose.

Fig. 4 is a cross-section of our trowel taken on the line I—I of Fig. 1, with a mold element adapted to form a hollow and an additional gauge member added to the right.

Figs. 5 and 6 are diagrammatically relative to Figs. 3 and 1, illustrating shapes produced by different settings of the articulated members.

Fig. 7 is diagrammatically related to Fig. 4.

Similar reference characters refer to similar parts throughout the several views.

Referring to the drawings, the handle 9 secured to the brackets 10, 10 by the screws 11, 11 forms the structure to which the mold element 12 is removably secured thereto by the screws 13, 13, said element being vertically parallel with the structure. The elements 12, as well shown in Figs. 1, 3 and 4 and indicated by dotted lines in Fig. 2 are provided with the securing bosses 14 which are faced off parallel to make true contact with the adjacent surface of the first gauge-member 15 and screwthreaded centrally to match the lock-screws 16 adapted to secure the gauge 15 to said element as shown in Fig. 3; said gauge being provided with the slots 17, 17 which permit of right or left adjustment of the gauge 15, as viewed in Fig. 2 and as indicated by the dotted lines in 18 in Fig. 3. Said gauge 15 at the forward end is turned to a right angle to form the flange 19.

By reference to Fig. 2 the gauge 15 is seen to be notched out so as to form the opening 20 for accommodation of the hand while using the tool. Figs. 3 and 4 show the gauge 15 turned to a right angle at the forward end to form the flange 19 which is drilled and threaded to receive the lock-screws 21, 21 which secure the second gauge member 22 thereto said gauge being of angle-section and provided with the slots 23, 23 for right and left regulation of said second member, whereas, a third gauge-member 24 may be added to the limb 22ª in similar manner as shown in Fig. 4 being for use in instances where successive jogs are required or have to be worked from, such as deeply inset framings.

We do not wish to confine ourselves either to the number or particular shape of these articulated gauges, nor to any particular form of molding element.

To the left hand side of the trowel of the present invention, as shown in Figs. 1, 3 and 4, is the smoothing-member 25, said member comprising a flat plate co-extensive in length with the trowel per se, said plate comprising peculiar and novel features of construction combined with a novel function as follows:—

The functions of the member 25 are twofold, being that of a regulatively adjustable gauge, and that of a smoothing member adapted to cover relatively larger surfaces than may be covered by the tool when used merely as a mold-forming trowel without said member; the member being removable from the structure.

In Figs. 3 and 4 the member 25 is shown extending to the left of the mold-forming elements 12 having its inner surface 27 even therewith and extending at a right angle to the first gauge member 15. At the point 26 said member is offset to form the tang element 25$^a$, being notched out at the corners 25$^b$, as indicated in Fig. 1 by dotted lines, so that said tang may pass between the brackets 10, 10 and extend over to the member 15, said tang being provided with the slots 28, 28 and the lock-screws 29, 29 for regulative left and right adjustment or removal of said member 25 with regulation to said structure.

The Figures 5, 6 and 7 outline three different forms of finishes which may be produced on plastic cementitious matter by the use of our improved trowel, obviously many other forms can be produced by a proper combination of molds and gauges carefully set with relation to the manipulating structure.

It is believed that the construction, operation and advantages of the present invention will now be clearly understood, the embodiment has been disclosed in various ways in detail by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described our invention, what we claim as new is:—

1. An article of manufacture, a combination trowel, comprising a supporting structure, a mold element removably carried thereby, the axis of the mold being parallel with the axis of the structure, the inner surface of the mold being adapted to shape the surface of cementitious matter, foundation bosses on the outer structure of said mold, constructed and adapted for inter-engagement with lock-screws adapted to suitably secure a primary gauge member to said mold, said member being slotted for regulative adjustment forward or backward in relation to said structure in a plane parallel therewith and provided with a member longitudinally co-extensive with said gauge and extending laterally therefrom.

2. An article of manufacture as specified in claim 1, a secondary gauge member carried by the primary member and adapted to co-act with said primary member and said mold to produce successive indentations in plastic cementitious surfaces.

3. An article of manufacture as set forth in claim 1, a primary gauge member, means for attachment thereto of a plurality of associated gauges of angle cross-section having complementary slots and lock-screws to provide each gauge with extensible regulative adjustment relative to the others and to a mold element.

4. An article of manufacture as defined in claim 1 having a primary gauge member disposed in proximity to a handle structure, bifurcated lateral projections extending in the same plane as the surface of said gauge and a notched portion extending between said projection to accommodate the hand of an operator.

In testimony whereof we have hereunto set our hands.

JOHN R. BAKER.
RALPH B. PARSONS.